(12) United States Patent
Astrachan

(10) Patent No.: US 7,170,955 B2
(45) Date of Patent: Jan. 30, 2007

(54) METHOD AND APPARATUS FOR ACCURATELY DETECTING PRESENCE OF A VALID SIGNAL

(75) Inventor: Paul Astrachan, Austin, TX (US)

(73) Assignee: VIXS Systems, Inc., Toronto (CA)

( * ) Notice: Subject to any disclaimer, the term of this patent is extended or adjusted under 35 U.S.C. 154(b) by 813 days.

(21) Appl. No.: 10/103,325

(22) Filed: Mar. 21, 2002

(65) Prior Publication Data
US 2003/0179839 A1 Sep. 25, 2003

(51) Int. Cl.
*H03D 1/00* (2006.01)
(52) U.S. Cl. ............................ 375/343; 375/340
(58) Field of Classification Search ................ 375/343, 375/340, 350, 316, 150, 342, 360, 142; 379/377; 370/520, 526, 320, 335, 342, 441, 479, 515
See application file for complete search history.

(56) References Cited

U.S. PATENT DOCUMENTS 5,151,922 A * 9/1992 Weiss ........................ 375/217
5,337,332 A * 8/1994 Yaguchi et al. ............. 375/340
5,412,589 A * 5/1995 Williams et al. ............ 708/425
5,822,424 A * 10/1998 Kim et al. ................... 379/377
5,848,108 A * 12/1998 Tong et al. .................. 375/350

* cited by examiner

*Primary Examiner*—Dac Ha
*Assistant Examiner*—Jaison Joseph

(57) ABSTRACT

A method and apparatus for accurately detecting the presence of a valid signal includes processing that begins by determining the energy level of an input signal in real time to produce a real time energy level. The processing then continues by delaying the input by a period of the valid signal to produce a delayed input. The processing then continues by correlating the input with the delayed input to produce a correlated input. The processing continues by determining the energy of the correlated input to produce a correlated energy level. The processing then continues by comparing the correlated energy level with the real time energy level to produce a probability that the input is a valid signal. The processing then continues by generating a valid signal probability indication based on the probability that the input is a valid signal.

31 Claims, 6 Drawing Sheets functional diagram of data detection module 20 radio receiver 10 functional diagram of data detection module 20

METHOD AND APPARATUS FOR ACCURATELY DETECTING PRESENCE OF A VALID SIGNAL

TECHNICAL FIELD OF THE INVENTION

This invention relates generally to wireless communication systems and more particularly to receiving transmissions within such wireless communication systems.

BACKGROUND OF THE INVENTION

Wireless communication systems are known to include a plurality of wireless communication devices that communicate directly (e.g., point-to-point) or through an infrastructure. For direct communications, a wireless communication device, such as a radio, cellular telephone, station coupled to a personal computer or laptop, et cetera, transmits data on a particular radio frequency channel directly to another wireless communication device. For infrastructure-supported communications, a wireless communication device transmits data on an assigned radio frequency channel to an access point (or a base station). The access point determines the targeted wireless communication device from the received RF signals. If the targeted wireless communication device is affiliated with the access point, the access point transmits the data to the targeted wireless communication device on a radio frequency channel. If the targeted wireless communication device is not affiliated with the access point, the access point forwards the data to a central station, which routes the data to the access point that is affiliated with the targeted wireless communication device.

To ensure reliability of data transmissions within a wireless communication system and to ensure interoperability of differing manufacturers' equipment, standards have been developed. Such wireless communications standards include IEEE8 02.11, Bluetooth, advanced mobile phone services (AMPS), digital AMPS, global system for mobile communications (GSM), code division multiple access (CDMA), local multi-point distribution services (LMDS), multi-channel, multi-point distribution systems (MMDS), and/or variations thereof.

Such standards prescribe operating parameters for particular types of wireless communication systems. For example, the IEEE 802.11a standard defines a wireless local area network that prescribes a frequency band of use, division of the frequency band into channels and sub-channels, encoding/decoding convention, modulation/demodulation convention, frame format, data rates, et cetera. Further, the IEEE 802.11a standard provides various combinations of data rates and modulation schemes, which can be selected via a coding rate corresponding to a particular modulation scheme.

In such standard compliant systems, data is transmitted in a particular format such that the targeted wireless communication device, or devices, can accurately recover the transmitted data. For instance, many standards prescribe for the use of preambles to inform the targeted wireless communication device, or devices, that data is to come. As such, the receiver portion of the targeted wireless communication device, or devices, monitors baseband signals (i.e., a modulated RF signal that has been converted down to baseband) to determine if the baseband signals contain a valid preamble. If a baseband signal includes a valid preamble, the receiver processes the baseband signal to recapture the transmitted data. To determine whether the baseband signal includes a valid preamble, the receiver includes a correlator.

As is known, a correlator compares the incoming baseband signal to a stored representation of a valid preamble. If the beginning portion of the incoming baseband signal (e.g., the portion that would correlate to a preamble of a valid signal) matches the stored valid preamble, the correlator indicates that the signal is valid. Based on the correlator's indication, the remaining portions of the receiver are enabled to recover the data from the baseband signal.

If the correlator falsely identifies a valid signal, the subsequent processing by the receiver is wasted. For portable wireless communication devices, wasted receiver processing corresponds to wasted power, which reduces the battery life of a wireless communication device. Such false identifications occur more frequently as the signal strength of the received RF signal decreases. As such, many wireless communication devices have a minimum signal strength requirement to reduce the number of false identifications, but does so at the cost of limiting the range of the wireless communication device.

Therefore, a need exists for a method and apparatus that accurately detects the presence of a valid signal such that the range of wireless communication devices is extended, minimum signal strength requirements are reduced and/or eliminated, and/or power consumption of wireless communication devices is reduced.

DETAILED DESCRIPTION OF A PREFERRED EMBODIMENT

Generally, the present invention provides a method and apparatus for accurately detecting the presence of a valid signal. Such a method and apparatus includes processing that begins by determining the energy level of an input signal in real time to produce a real time energy level. The processing then continues by delaying the input by a period of the valid signal to produce a delayed input. For example, if the repetitive signal in a preamble were 16 bits in length, the input signal would be delayed by the equivalent of 16 bits. The processing then continues by correlating the input with the delayed input to produce a correlated input. For valid signals, the input being correlated with the delayed input will produce a signal that resembles the input signal, but delayed. If the input signal is not a valid signal, the correlated input will resemble noise. The processing continues by determining the energy of the correlated input to produce a correlated energy level. The processing then continues by comparing the correlated energy level with the real time energy level to produce a probability that the input is a valid signal. For instance, if the correlated energy level is greater than the real time energy level, a likelihood exists that the input signal is valid. The processing then continues by generating a valid signal probability indication based on the probability that the input is a valid signal. By generating a valid signal probability, the radio receiver may delay activation of remaining portions until the valid signal probability is very high or at a desired threshold. Thus, false valid signal identification is reduced, which in turn reduces power consumption of wireless communication devices and also may extend the range of wireless communication devices since they can now more accurately detect the presence of a valid signal.

Figure 1:
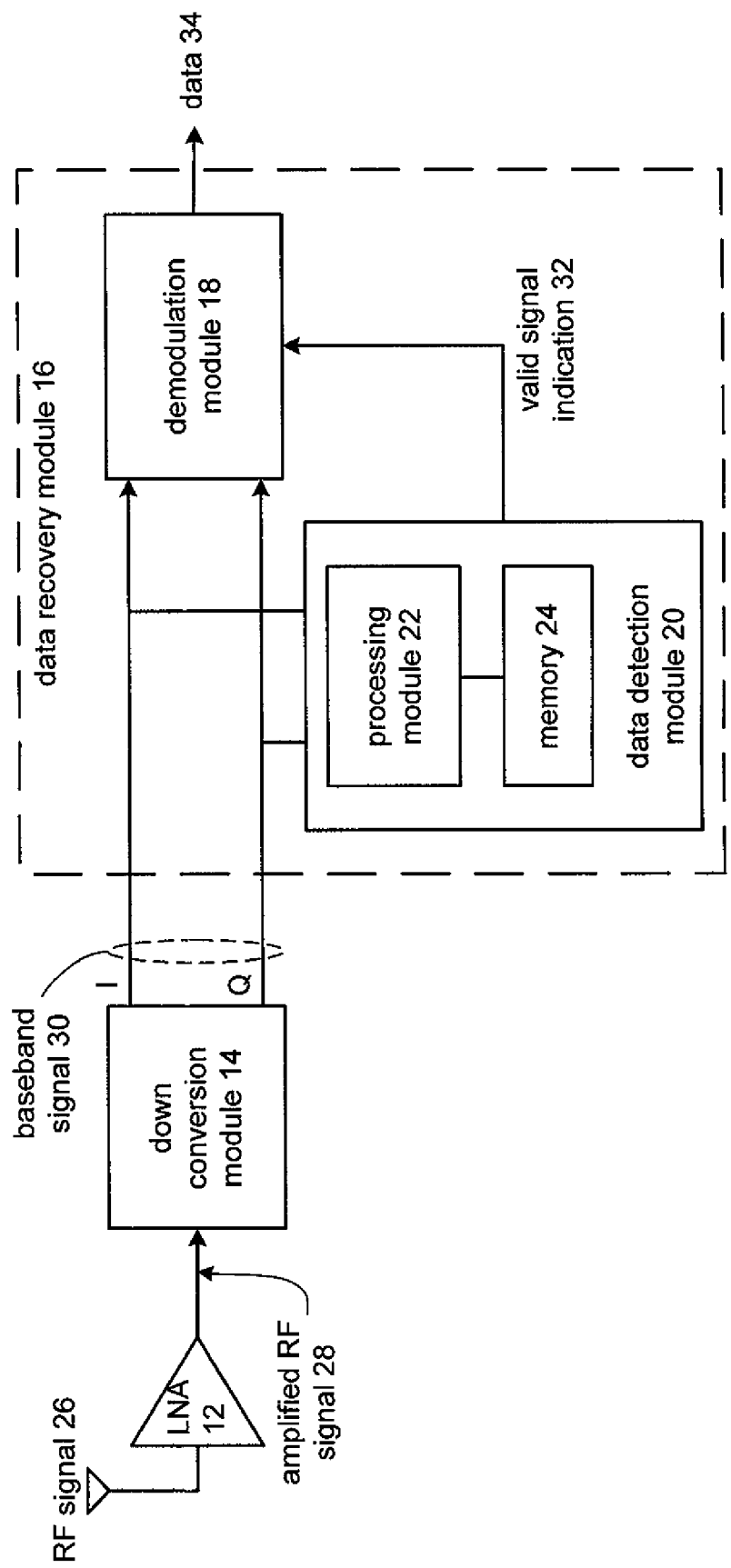
FIG. 1 illustrates a schematic block diagram of a radio receiver in accordance with the present invention.

The present invention can be more fully described with reference to FIGS. 1–6. FIG. 1 illustrates a schematic block diagram of a radio receiver 10 that includes a low noise amplifier 12, a down conversion module 14, and a data recovery module 16. The data recovery module 16 includes a demodulation module 18 and a data detection module 20. The data detection module 20 includes a processing module 22 and memory 24. The processing module 22 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 24 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 22 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 24 stores, and the processing module 22 executes, operational instructions corresponding to at least some of the steps and/or functions illustrated in FIGS. 2–6.

In operation, the radio receiver 10 receives a radio frequency (RF) signal 26 via an antenna. The antenna is coupled to the low noise amplifier 12 and provides it with the RF signal 26. The low noise amplifier 12 amplifies the RF signal 26 to produce an amplified RF signal 28. As one of average skill in the art will appreciate, a bandpass filter may precede and/or follow the low noise amplifier to tune the radio receiver to a particular radio frequency.

The down conversion module 14 receives the amplified RF signal 28 and produces an I component and a Q component of a baseband signal 30. The down conversion module 14 may include one or more intermediate frequency stages to step down the carrier frequency from that of the radio frequency to baseband.

The data recovery module 16 receives the I and Q components of the baseband signal 30 via the data detection module 20 and the demodulation module 18. In power saving modes, the radio receiver 10 will disable the demodulation module 18 until the data detection module 20 has produced a valid signal indication 32. The data detection module interprets the baseband signal 30 to produce the valid signal indication 32. The processing performed by the data detection module 20 is further described with reference to FIGS. 2–6.

Figure 2:
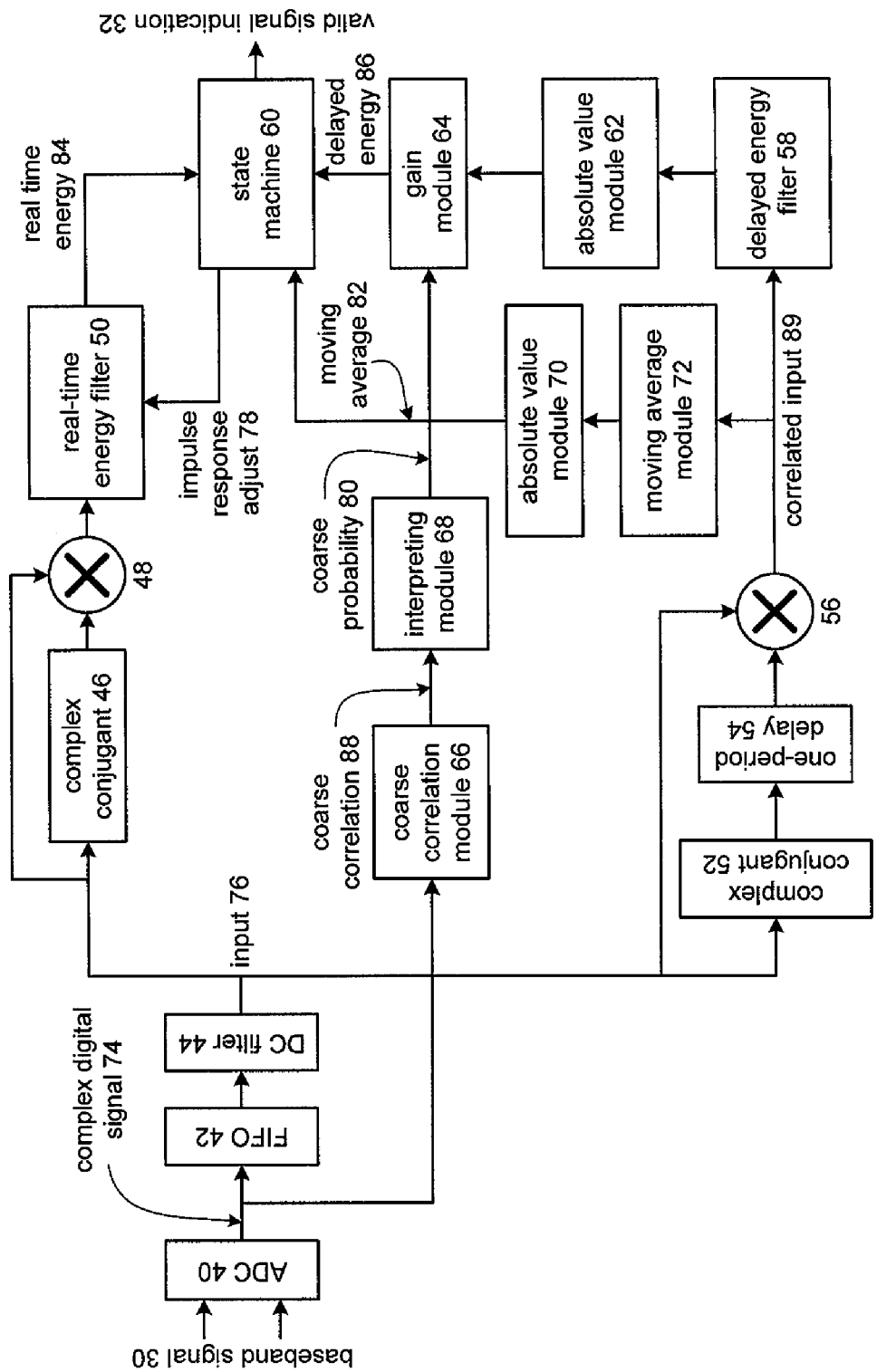
FIG. 2 illustrates a functional schematic block diagram of a data detection module in accordance with the present invention.

FIG. 2 illustrates a functional diagram of the data detection module 20. The data detection module 20 includes a first-in-first-out buffer 42, a DC filter 44, a complex conjugate module 46, a multiplier 48, a real time energy filter 50, a $2^{nd}$ complex conjugate module 52, a one-period delay module 54, a $2^{nd}$ multiplier 56, a delayed energy filter 58, a state machine 60, an absolute value module 62, a gain module 64, a coarse correlation module 66, an interpreting module 68, a second absolute value module 70, and a moving average module 72. The data detection module 20 may further include an analog to digital converter 40. Alternatively, the analog to digital converter 40 may be included in the down conversion module 14 or a separate device coupled between the down conversion module 14 and the data recovery module 16.

The analog to digital converter 40 receives the I and Q components of the baseband signal 30 and converts them into a complex digital signal 74. For the purposes of this discussion, a complex digital signal includes a real part and imaginary part, which may be represented by a single signal or separate signals. The first-in-first-out buffer 42 temporarily stores the complex digital signal 74 before providing it to the DC filter 44. The DC filter 44 filters high frequency components from the complex digital signal leaving a baseband input 76.

The input 76 is a complex signal that is provided to the complex conjugate modules 46 and 52. The complex conjugate module 46 performs a complex conjugate function on input 76 to produce a conjugate value. The multiplier 48 multiplies the input 76 with the complex conjugate 46's output to produce a mixed complex input. For example, if the input 76 is represented by (Real+Imaginary,) then the complex conjugate module produces the conjugate value of (R−I) and the multiplier 48 produces the mixed complex input of $(R^2+I^2)$.

The real time energy filter 50 receives the mixed complex signal from multiplier 48 and produces a real time energy value 84. The real time energy filter 50 is essentially a low pass filter that may have its impulse response adjusted in accordance with an impulse response adjust signal 78. For instance, during early detection of a valid signal, the impulse response of the real time energy filter may be fast and then slowed as the likelihood that the input is a valid signal. This allows the real time energy to reach an appropriate level quickly for valid signals and reduce the deviation of the level as the likelihood of the input being valid increases. The real time energy filter 50 provides the real time energy level 84 to the state machine 60, which determines the valid signal indication 32 as will be discussed below.

The complex conjugate module 52 performs a complex conjugate function on the input 76 to produce a complex conjugate input. The one period delay module 54 delays the complex conjugate input to produce a delayed complex conjugate input. The multiplier 56 multiplies the input 76 with the delayed complex conjugate input to produce a correlated input 89. If the input 76 is valid, the correlated input 89 will resemble the output of multiplier 48 but delayed by one period of a repetitive signal in the preamble of a valid signal. If the input 76 is not a valid signal, the correlated input 89 will resemble noise. For example, for an IEEE802.11a compliant wireless communication device, the preamble includes a short training sequence and a long training sequence. The short training sequence includes repetitive signals that are 16 bits in length while the long training period includes repetitive signals that are 64 bits in length. As such, during the short training sequence, the one period delay is set to correspond to 16 bits and for the long training sequence is set to correspond to 64 bits. Thus, for the short training sequence, the correlated input 89 will resemble the output of multiplier 48, but delayed by the equivalent of 16 bits.

The multiplier 58 provides the correlated input 89 to the moving average module 72 and to the delayed energy filter 58. The delayed energy filter 58 filters the correlated input 89 to produce an energy level of the correlated input. The absolute value module 62 generates an absolute value for the energy level of the correlated input and provides it to the gain module 64.

The gain module 64 adjusts the magnitude of the energy level of the correlated input based on a coarse probability 80 to produce the delayed energy level 86. The generation of the coarse probability 80 will be discussed subsequently. The state machine 60 receives the delayed energy level 86 and compares it with the real time energy level 84 to produce a probability of the input signal being a valid signal. The state machine 60 also receives a moving average 82, which it uses in comparison with the real time energy 84 to conclusively determine whether the input 76 is a valid signal or not. If the input 76 is a valid signal, the state machine 60 generates a valid signal indication 32. If the input 76 is not a valid signal, the state machine 60 does not generate the valid signal indication 32 and the demodulation module 18 is not enabled. Thus, power consumption is reduced since the data detection module 20 has substantially reduced and/or eliminated false identifications of valid signals.

The moving average module 72 produces a moving average of the correlated input 89. The absolute value module 70 provides an absolute value of the output of the moving average module 72 to produce the moving average 82. The state machine 60 interprets the moving average with respect to the real time energy level at the end of an initialization sequence (e.g., the end of the short training sequence and/or long training sequence for an 802.11a implementation). The state machine 60 then indicates that the input signal is valid when the interpretation of the moving average 82 with the respect to the real time energy level 84 was favorable. This will be discussed in greater detail with reference to FIG. 3.

The coarse correlation module 66 receives the complex digital signal 74 and produces a coarse correlation value 88. The coarse correlation module 66 is providing a simple correlation function that compares the complex digital signal 74 with a stored representation of a valid preamble of a signal. The interpreting module 68 receives the coarse correlation 88 and generates a coarse probability 80 therefrom. In general, the interpreting module 68 is interpreting the coarse correlation 80 to determine the likelihood that the input 76 is valid and to establish the gain level for the gain module 64 proportional to the likelihood. The more likely the input is valid, the greater the coarse probability 80 will be, thus the greater the gain level of the gain module 64 will be.

Figure 3:
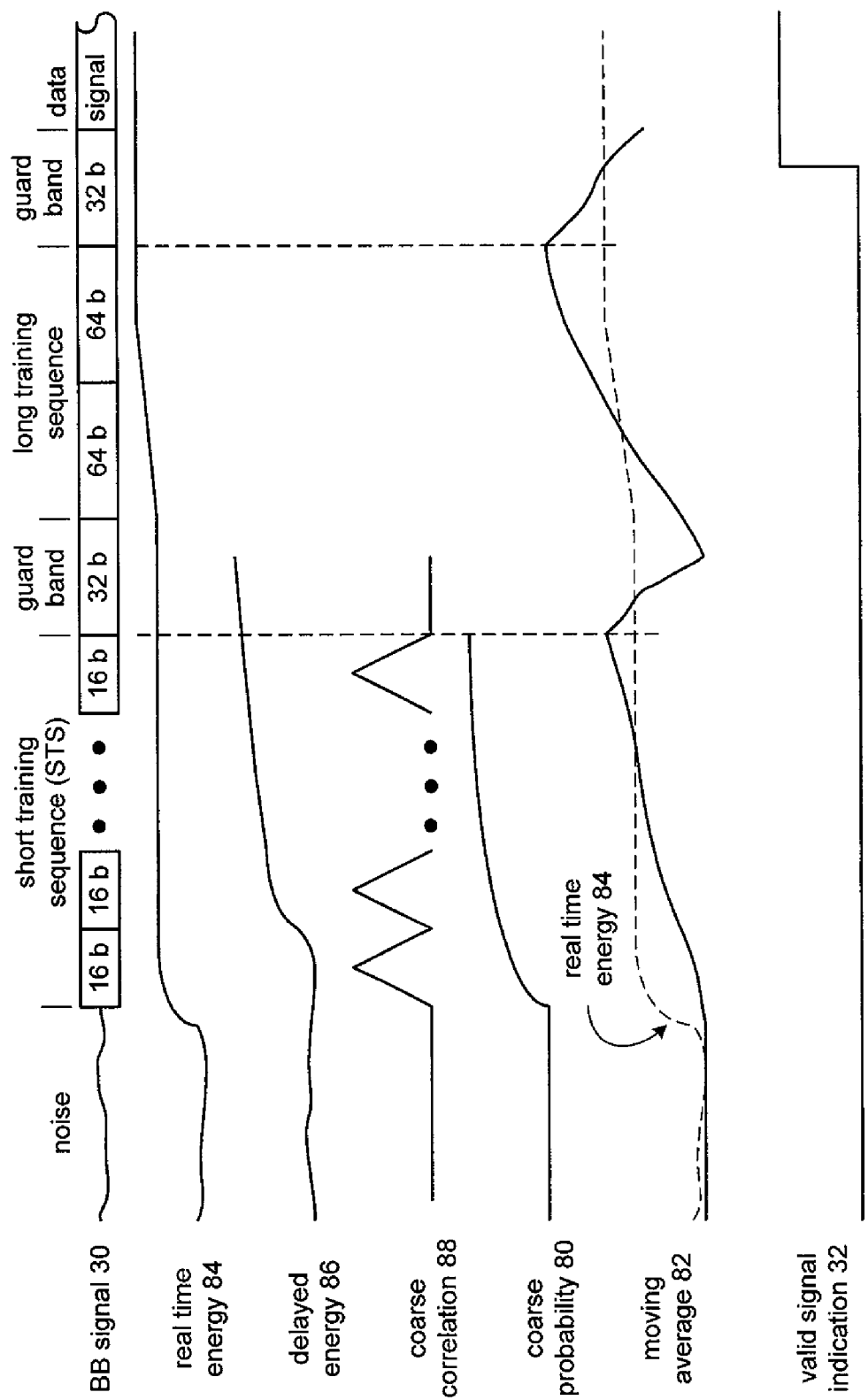
FIG. 3 illustrates a graphical representation of signals being processed within the data detection module of FIG. 2.

FIG. 3 illustrates a graphical representation of the signals produced by the data detection module 20 of FIG. 2. The baseband signal 30 includes a noise section and a valid signal portion. The valid signal portion, for 802.11a implementation includes a short training sequence, a guard band, a long training sequence, a $2^{nd}$ guard band and data. During the noise portion of the baseband signal 30, i.e., when no data is being received, the real time energy filter 50 is producing real time energy level 84, which is relatively low and corresponds to the energy level of the noise. Similarly, the delayed energy level 86 is also low corresponding to the noise. When the $1^{st}$ short training sequence signal is received (i.e., the first 16 bit block of the STS), the real time energy filter is in a fast impulse response mode and ramps up quickly to indicate the energy of the first short training sequence signal. Simultaneously, the coarse correlation signal 88 is generated to indicating that there is energy in the baseband signal that correlates to the stored representation on a valid preamble.

For the $1^{st}$ short training sequence signal, the delayed energy 86 remains low. This is due to the one period delay module 54, which for an IEEE 802.11a implementation is initially set to provide a delay equivalent to 16 bits. After the one period delay, the delayed energy 86 rises correspondingly to the gain of the gain module 64 as well as the energy within the short training sequence signals.

The coarse correlation 88 continues to indicate that energy is present and that it correlates with the energy of the stored valid preamble. As such, the interpreting module 68 is increasing the coarse probability 80. As such, the gain for the delayed energy path via the gain module 64 is increasing. As such, the magnitude of the delayed energy 86 increases and exceeds the magnitude of the real time energy level 84, which provides a good first indication that the baseband signal 30 is currently providing a valid signal.

The moving average 82 is increasing as the valid preamble is detected until the end of the short training sequence. At that time, the moving average 82 begins to decay. At a predetermined time after the end of the short training sequence has been indicated, the current moving average 82, which represents the cumulative energy level of the plurality of repetitive signals of the STS, is compared with the peak value of the moving average. If the moving average 82 has decayed sufficiently from its peak at the predetermined time (which indicates that a signal was the cause for the rise in the moving average and not some random occurrence of energy bursts that would continue to increase, or at least keep from decaying, the moving average) the comparison is favorable and the state machine increases the probability that the input is a valid signal. If the magnitude of the moving average 82 has not sufficiently decayed from its peak value, the state machine indicates that the signal is invalid and the processing starts all over.

When the probability that the input is valid is generated, the data detection module switches into processing the long training sequence of the preamble of the valid signal. In this processing mode, the delayed energy level 86, the coarse correlation 88 and the coarse probability 80 are no longer used. As such, the moving average path, having the one period delay changed from 16 bits to 64 bits within delay module 54 produces a new moving average 82. The new moving average 82 represents a cumulative energy level of the LTS and is interpreted to determine the end of the long training sequence. At the end of the long training sequence, the state machine compares the magnitude of the moving average 82 with the magnitude of the real time energy 84. If the moving average 82 is greater than the real time energy 84, the state machine conclusively determines that the signal is valid. If the moving average 82 is less than the real time energy 84 the state machine indicates that the signal is not valid. As such, the data detection module 20 provides a conclusive determination whether the baseband signal 30 is valid before subsequent digital processing is activated. As such, power consumption is reduced and the range of wireless communication devices is increased since the data detection module 20 is extremely sensitive in detecting the validity of incoming signals and can do so when the signal strength is low.

Figure 4:
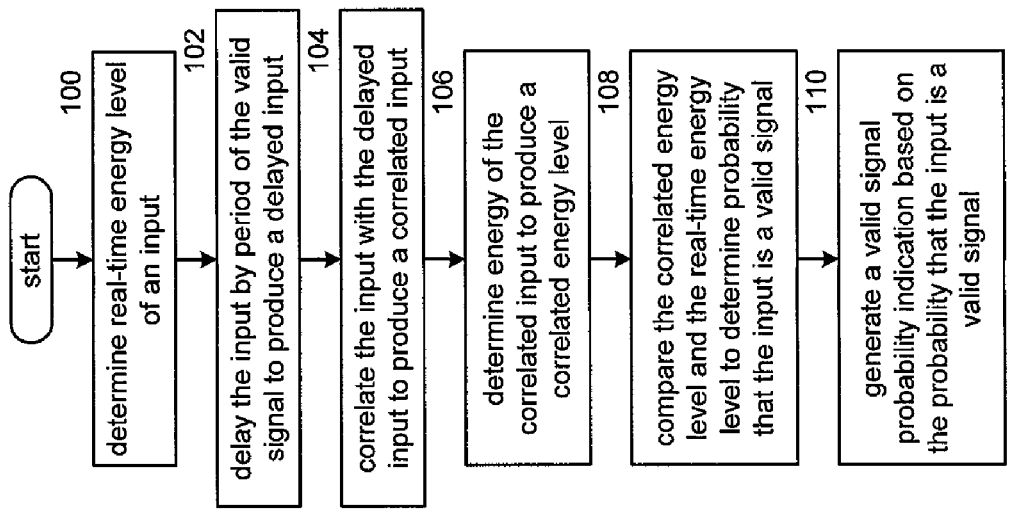
FIG. 4 illustrates a logic diagram of a method for accurately detecting the presence of a valid signal in accordance with the present invention.

FIG. 4 illustrates a logic diagram of a method for accurately detecting the presence of a valid signal. The process begins at Step 100 where the data detection module determines real time energy level of an input. The data detection module may determine the real time energy level by first receiving the input as a complex signal and then performing a complex conjugate on the input signal to produce a complex conjugate input. The data detection module will then mix the input with the complex conjugate input to produce a mixed complex input. The processing module will then filter the mixed complex input to produce the real time energy level.

The process then proceeds to Step 102 where the data detection module delays the input by a period of the valid signal to produce a delayed input. For example, if the wireless communication device is 802.11a compliant, the period of the valid signal during the short training sequence will be 16 bits and will be 64 bits during the long training sequence. For other standards, the period of the valid signal will correspond to the period of the repetitive preamble signals.

The process then proceeds to Step 104 where the data detection module correlates the input with the delayed input to produce a correlated input. The process then proceeds to Step 106 where the data detection module determines energy of the correlated input to produce a correlated energy level. The correlated energy level may be produced as described with reference to FIG. 2.

The process then proceeds to Step 108 where the data detection module compares the correlated energy level and the real time energy level to determine probability that the input is a valid signal. The process then proceeds to Step 110 where the data detection module generates a valid signal probability indication based on the probability that the input is a valid signal.

Figure 5:
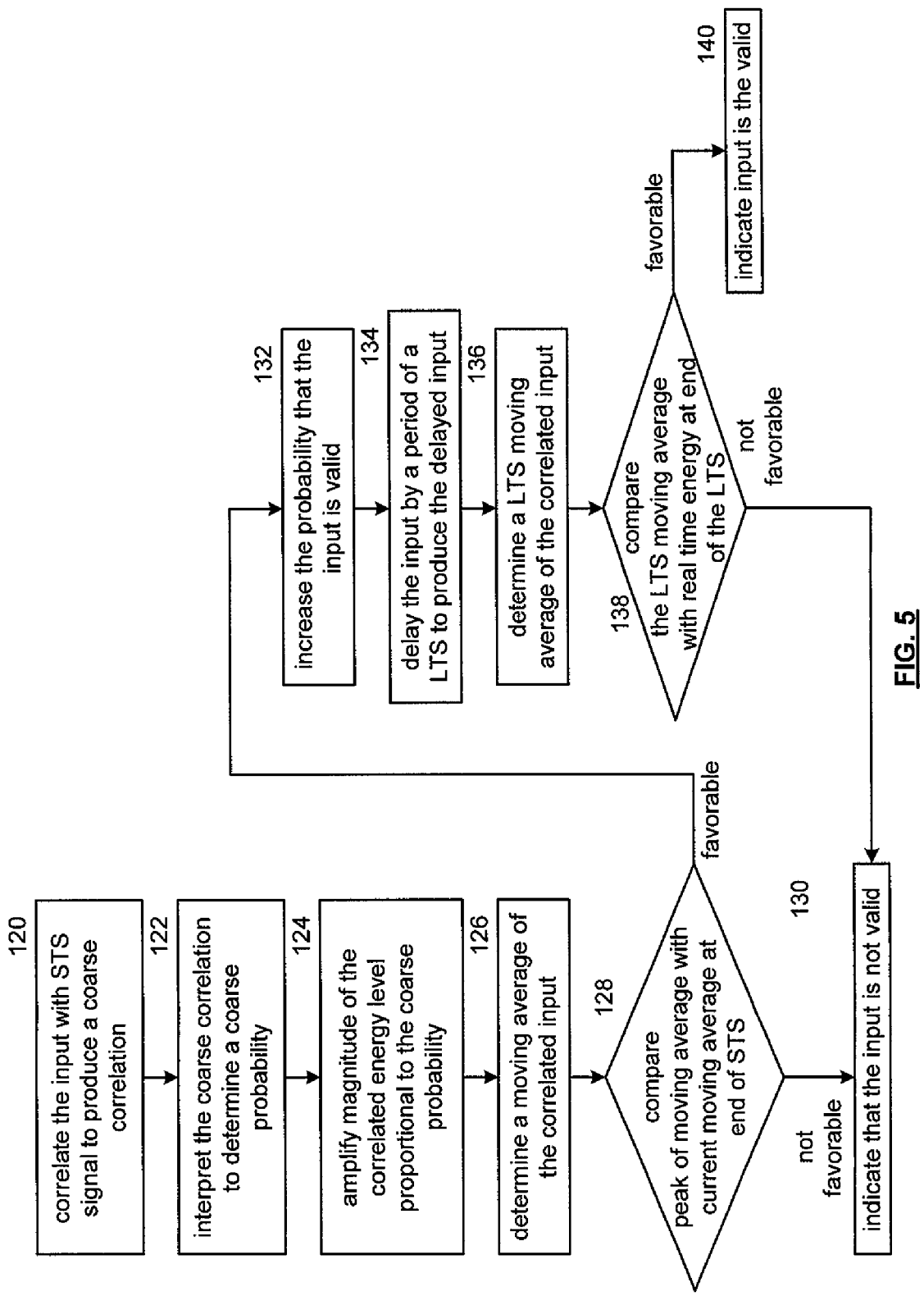
FIG. 5 illustrates a logic diagram of a method that expands on the method of FIG. 4.

FIG. 5 illustrates a logic diagram that corresponds to the generation of a valid input signal by the data detection module when valid signals are in compliance with the 802.11a standard. The processing begins at Step 120 where the data detection module correlates the input with a short training sequence signal to produce a coarse correlation. The process then proceeds to Step 122 where the data detection module interprets the coarse correlation to determine a coarse probability. The process then proceeds to Step 124 where the data detection module amplifies the magnitude of the correlated energy level based on the coarse probability. The process then proceeds to Step 126 where the data detection module determines a moving average of the correlated input.

The process then proceeds to Step 128 where the data detection module compares the moving average with the peak of the moving average at the end of the short training sequence. As such, the data detection module is using the moving average to determine the end of the short training sequence and also using it to determine whether the signal is likely valid or not. If the comparison was unfavorable, for example, the moving average has not sufficiently decayed with respect to the peak of the moving average, the process proceeds to Step 130 where the data detection module indicates that the input is not valid.

If, however, the comparison at Step 128 was favorable, the process proceeds to Step 132 where the data detection module increases the probability that the input is valid. The process then proceeds to Step 134 where the data detection module delays the input by a period of a long training sequence to produce the delayed input. The process then proceeds to Step 136 where the data detection module determines a long training sequence moving average of the correlated input. The process then proceeds to Step 138 where the data detection module compares the long training sequence moving average with the real time energy level at the end of the long training sequence. If the comparison is unfavorable, the data detection module indicates that the input is not valid. If, however, the comparison was favorable, the process proceeds to Step 140 where the data detection module indicates that the input is valid.

Figure 6:
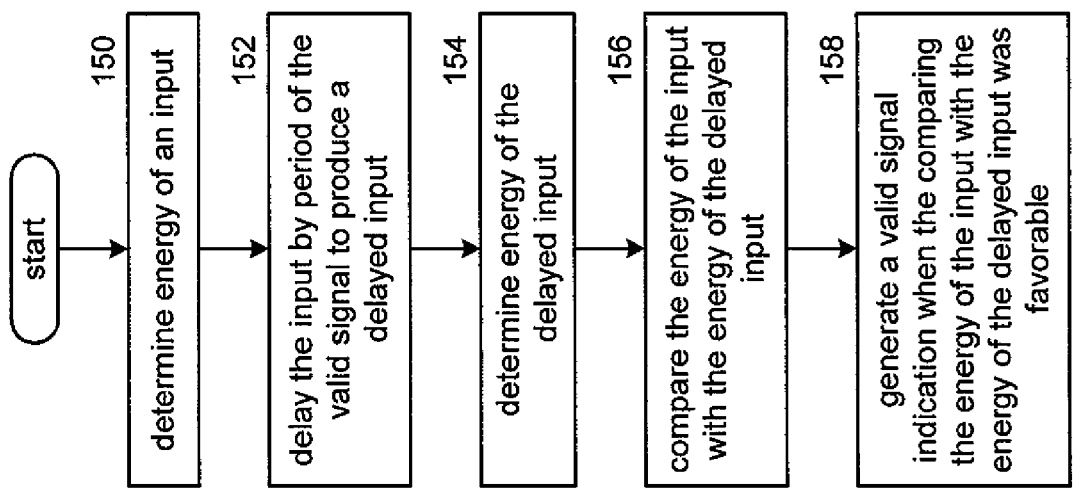
FIG. 6 illustrates a logic diagram of an alternate method for accurately detecting the presence of a valid signal in accordance with the present invention.

FIG. 6 illustrates a logic diagram of an alternate method for accurately detecting the presence of a valid signal. The process begins at Step 150 where the data detection module determines energy of an input. The process then proceeds to Step 152 where the data detection module delays the input by a period of the valid signal to produce a delayed input. The process then proceeds to Step 154 where the data detection module determines energy of the delayed input. The process then proceeds to Step 156 where the data detection module compares the energy of the input with the energy of the delayed input. The process then proceeds to Step 158 where the data detection module generates a valid signal indication when the comparing of the energy of the input with the energy of the delayed input was favorable. If the comparison was unfavorable, the data detection module indicates that the signal is invalid.

The preceding discussion has presented a method and apparatus for accurately detecting the presence of a valid signal. By accurately detecting the presence of valid signals, false identifications are substantially reduced or eliminated, thus reducing power consumption within wireless communication devices and increasing the range of wireless communication device. As one of average skill in the art will appreciate, other embodiments may be derived from the teachings of the present invention, without deviating from the scope of the claims.

What is claimed is:

1. A method for accurately detecting presence of a valid signal, the method comprises:
   determining energy of an input to produce a real-time energy level;
   delaying the input by period of the valid signal to produce a delayed input;
   correlating the input with the delayed input to produce a correlated input;
   determining energy of the correlated input to produce a correlated energy level;
   comparing the correlated energy level and the real-time energy level to determine probability that the input is a valid signal;
   generating a valid signal probability indication based on the probability that the input is a valid signal;
   determining a moving average of the correlated input;
   interpreting the moving average to determine end of an initialization sequence of the valid signal;
   interpreting the moving average with respect to the real-time energy level at the end of the initialization sequence; and
   indicating that the input is a valid signal when the interpreting the moving average with respect to the real-time energy level was favorable.

2. The method of claim 1, wherein the determining the energy of the input further comprises:
   receiving the input as a complex signal;
   performing a complex conjugant on the input to produce a complex conjugant input;
   mixing the input with the complex conjugant input to produce a mixed complex input; and filtering the mixed complex input to determine the real-time energy level.

3. The method of claim 1, wherein the delaying the input by period of the valid signal and the correlating the input with the delayed input further comprise:
receiving the input as a complex signal;
performing a complex conjugant on the input to produce a complex conjugant input;
delaying, by the period of the valid signal, the complex conjugant input to produce a delayed complex conjugant input;
mixing the input with the delayed complex conjugant input to produce a mixed delayed complex input; and
filtering the mixed delayed complex input to determine the correlated energy level.

4. The method of claim 1 further comprises:
correlating the input with a representation of the valid signal to produce a coarse correlation;
interpreting the coarse correlation to determine a course probability that the input is a valid signal; and
amplifying magnitude of the correlated energy level proportional to the coarse probability that the input is a valid signal.

5. The method of claim 1 further comprises:
varying rate of impulse response of the determining the real-time energy based on the probability that the input is a valid signal.

6. The method of claim 1 further comprises:
the delaying of the input by a period of a short training sequence of the valid signal to produce the delayed input;
correlating the input with a representation of the short training sequence to produce a coarse correlation;
interpreting the coarse correlation to determine a coarse probability that the input is a valid signal; and
amplifying magnitude of the correlated energy level proportional to the coarse probability that the input is a valid signal.

7. The method of claim 6 further comprises:
determining a moving average of the correlated input;
determining an end of the short training sequence of the valid signal;
interpreting the moving average with respect to a peak of the moving at the end of the short training sequence;
increasing the probability that the input is a valid signal at the end of the initialization sequence when the interpreting the moving average with respect to the peak of the moving average was favorable; and
indicating that the input is not valid when the interpreting the moving average with respect to the peak of the moving average was not favorable.

8. The method of claim 7, wherein when the probability that the input is a valid signal increases, further comprises:
the delaying of the input by a period of a long training sequence of the valid signal to produce the delayed input;
determining a long training sequence moving average of the correlated input;
interpreting the long training sequence moving average to determine end of the long training sequence of the valid signal;
interpreting the long training sequence moving average with respect to the real-time energy level at the end of the long training sequence;
indicating that the input is the valid when the interpreting the long training sequence moving average with respect to the real-time energy level was favorable; and
indicating that the input is not valid when the interpreting the long training sequence moving average with respect to the real-time energy level was not favorable.

9. A method for accurately detecting presence of a valid signal, the method comprises:
determining energy of an input;
delaying the input by period of the valid signal to produce a delayed input;
determining energy of the delayed input;
comparing the energy of the input with the energy of the delayed input; and
generating a valid signal indication when the comparing the energy of the input with the energy of the delayed input was favorable;
correlating the input with a representation of the valid signal to produce a coarse correlation;
interpreting the coarse correlation to determine a coarse probability that the input is a valid signal; and
amplifying magnitude of the energy of the delayed input proportional to the coarse probability that the input is a valid signal.

10. The method of claim 9 further comprises:
generating an invalid signal indication when the comparing the energy of the input with the energy of the delayed input was unfavorable.

11. The method of claim 9, wherein the determining energy of the delayed input further comprises:
generating a current energy level of the delayed input; and
generating a moving average energy level of the delayed input.

12. The method of claim 11, wherein the comparing the energy of the input with the energy of the delayed input and the generating the valid signal indication further comprise:
comparing the current energy level of the delayed input with the energy level of the input to produce a probability that the input is a valid signal;
when the probability that the input is a valid signal is above a threshold, determining an end of an initialization period of the valid signal based on the moving average energy level of the delayed input;
comparing, at the end of the initialization period, the moving average energy level of the delayed input with the energy level of the input; and
generating the valid signal indication when the comparing the moving average energy level of the delayed input with the energy level of the input was favorable.

13. The method of claim 12 further comprises:
generating an invalid signal indication when the probability that the input is a valid signal is below the threshold.

14. An apparatus for accurately detecting presence of a valid signal, the apparatus comprises:
processing module; and
memory operably coupled to the processing module, wherein the memory includes operational instructions that cause the processing module to:
determine energy of an input to produce a real-time energy level;
delay the input by period of the valid signal to produce a delayed input;
correlate the input with the delayed input to produce a correlated input;
determine energy of the correlated input to produce a correlated energy level;
compare the correlated energy level and the real-time energy level to determine probability that the input is a valid signal;

generate a valid signal probability indication based on the probability that the input is a valid signal;
determine a moving average of the correlated input;
interpret the moving average to determine end of an initialization sequence of the valid signal;
interpret the moving average with respect to the real-time energy level at the end of the initialization sequence; and
indicate that the input is the valid when the interpreting the moving average with respect to the real-time energy level was favorable.

15. The apparatus of claim 14, wherein the memory further comprises operational instructions that cause the processing module to determine the energy of the input by:
receiving the input as a complex signal;
performing a complex conjugant on the input to produce a complex conjugant input;
mixing the input with the complex conjugant input to produce a mixed complex input; and
filtering the mixed complex input to determine the real-time energy level.

16. The apparatus of claim 14, wherein the memory further comprises operational instructions that cause the processing module to delay the input by period of the valid signal and to correlate the input with the delayed input by:
receiving the input as a complex signal;
performing a complex conjugant on the input to produce a complex conjugant input;
delaying, by the period of the valid signal, the complex conjugant input to produce a delayed complex conjugant input;
mixing the input with the delayed complex conjugant input to produce a mixed complex input; and
filtering the mixed complex input to determine the correlated energy level.

17. The apparatus of claim 14, wherein the memory further comprises operational instructions that cause the processing module to:
correlate the input with a representation of the valid signal to produce a coarse correlation;
interpret the coarse correlation to determine a coarse probability that the input is a valid signal; and
amplify magnitude of the correlated energy level, proportional to the coarse probability that the input is a valid signal.

18. The apparatus of claim 14, wherein the memory further comprises operational instructions that cause the processing module to:
vary rate of impulse response of the determining the real-time energy based on the probability that the input is a valid signal.

19. The apparatus of claim 14, wherein the memory further comprises operational instructions that cause the processing module to:
delay the input by a period of a short training sequence of the valid signal to produce the delayed input;
correlate the input with a representation of the short training sequence to produce a coarse correlation;
interpret the coarse correlation to determine a coarse probability that the input is a valid signal; and
amplify magnitude of the correlated energy level proportional to the coarse probability that the input is a valid signal.

20. The apparatus of claim 19, wherein the memory further comprises operational instructions that cause the processing module to:
determine a moving average of the correlated input;
determine an end of the short training sequence of the valid signal;
interpret the moving average with respect to a peak of the moving average at the end of the short training sequence;
increase the probability that the input is a valid signal at the end of the initialization sequence when the interpreting the moving average with respect to the peak of the moving average was favorable; and
indicate that the input is not valid when the interpreting the moving average with respect to the peak of the moving average was not favorable.

21. The apparatus of claim 20, wherein the memory further comprises operational instructions that cause the processing module to, when the probability that the input is a valid signal increases:
delay the input by a period of a long training sequence of the valid signal to produce the delayed input;
determine a long training sequence moving average of the correlated input;
interpret the long training sequence moving average to determine end of the long training sequence of the valid signal;
interpret the long training sequence moving average with respect to the real-time energy level at the end of the long training sequence;
indicate that the input is the valid when the interpreting the long training sequence moving average with respect to the real-time energy level was favorable; and
indicate that the input is not valid when the interpreting the long training sequence moving average with respect to the real-time energy level was not favorable.

22. An apparatus for accurately detecting presence of a valid signal, the apparatus comprises:
processing module; and
memory operably coupled to the processing module, wherein the memory includes operational instructions that cause the processing module to:
determine energy of an input;
delay the input by period of the valid signal to produce a delayed input;
determine energy of the delayed input;
compare the energy of the input with the energy of the delayed input; and
generate a valid signal indication when the comparing the energy of the input with the energy of the delayed input was favorable;
correlate the input with a representation of the valid signal to produce a coarse correlation;
interpret the coarse correlation to determine a coarse probability that the input is a valid signal; and
amplify magnitude of the energy of the delayed input proportional to the coarse probability that the input is a valid signal.

23. The apparatus of claim 22, wherein the memory further comprises operational instructions that cause the processing module to:
generate an invalid signal indication when the comparing the energy of the input with the energy of the delayed input was unfavorable.

24. The apparatus of claim 22, wherein the memory further comprises operational instructions that cause the processing module to determine energy of the delayed input by:
generating a current energy level of the delayed input; and
generating a moving average energy level of the delayed input.

25. The apparatus of claim 24, wherein the memory further comprises operational instructions that cause the processing module to compare the energy of the input with the energy of the delayed input and to generate the valid signal indication by:
comparing the current energy level of the delayed input with the energy level of the input to produce a probability that the input is a valid signal;
when the probability that the input is a valid signal is above a threshold, determining an end of an initialization period of the valid signal based on the moving average energy level of the delayed input;
comparing, at the end of the initialization period, the moving average energy level of the delayed input with the energy level of the input; and
generating the valid signal indication when the comparing the moving average energy level of the delayed input with the energy level of the input was favorable.

26. The apparatus of claim 25, wherein the memory further comprises operational instructions that cause the processing module to:
generate an invalid signal indication when the probability that the input is a valid signal is below the threshold.

27. A radio receiver comprises:
low noise amplifier operably coupled to amplify a radio frequency (RF) signal to produce an amplified RF signal;
down conversion module operably coupled to convert the amplified RF signal into a baseband signal;
data recovery module operably coupled to recapture data from the baseband signal, wherein the data recovery module includes:
data detection module operably coupled to detect validity of the baseband signal to produce a valid signal indication; and
demodulation module operably coupled to demodulate the baseband signal to produce the data in accordance with the valid signal indication, wherein the data detection module includes:
processing module; and
memory operably coupled to the processing module, wherein the memory includes operational instructions that cause the processing module to:
determine energy of an input;
delay the input by period of the valid signal to produce a delayed input;
determine energy of the delayed input;
compare the energy of the input with the energy of the delayed input;
generate a valid signal indication when the comparing the energy of the input with the energy of the delayed input was favorable;
determine a moving average of the delayed input;
interpret the moving average to determine end of the short training sequence of the valid signal;
interpret the moving average with respect to the energy of the input at the end of the short training sequence;
increase the probability that the input is a valid signal at the end of the initialization sequence when the interpreting the moving average with respect to the energy of the input was favorable; and
indicate that the input is not valid when the interpreting the moving average with respect to the energy of the input was not favorable.

28. The radio receiver of claim 27, wherein the memory further comprises operational instructions that cause the processing module to determine energy of the delayed input by:
generating a current energy level of the delayed input; and
generating a moving average energy level of the delayed input.

29. The radio receiver of claim 28, wherein the memory further comprises operational instructions that cause the processing module to compare the energy of the input with the energy of the delayed input and to generate the valid signal indication by:
comparing the current energy level of the delayed input with the energy level of the input to produce a probability that the input is a valid signal;
when the probability that the input is a valid signal is above a threshold, determining an end of an initialization period of the valid signal based on the moving average energy level of the delayed input;
comparing, at the end of the initialization period, the moving average energy level of the delayed input with the energy level of the input; and
generating the valid signal indication when the comparing the moving average energy level of the delayed input with the energy level of the input was favorable.

30. The radio receiver of claim 27, wherein the memory further comprises operational instructions that cause the processing module to:
delay the input by a period of a short training sequence of the valid signal to produce the delayed input;
correlate the input with a representation of the short training sequence to produce a coarse correlation;
interpret the coarse correlation to determine a coarse probability that the input is a valid signal; and
amplify magnitude of the energy of delayed input proportional to the coarse probability that the input is a valid signal.

31. The radio receiver of claim 30, wherein the memory further comprises operational instruction that causes the processing module to, when the probability that the input is a valid signal increases:
delay the input by a period of a long training sequence of the valid signal, to produce the delayed input;
determine a long training sequence moving average of the delayed input;
interpret the long training sequence moving average to determine end of the long training sequence of the valid signal;
interpret the long training sequence moving average with respect to the energy of the input at the end of the long training sequence;
indicate that the input is the valid when the interpreting the long training sequence moving average with respect to the energy of file input was favorable; and
indicate that the input not valid when the interpreting the long training sequence moving average with respect to the energy of the input was not favorable.

* * * * *